United States Patent [19]

Morris

[11] Patent Number: 4,485,582
[45] Date of Patent: Dec. 4, 1984

[54] INSECT FEEDING STATION

[75] Inventor: Edward Morris, Paramus, N.J.

[73] Assignee: American Cyanamid Company, Stamford, Conn.

[21] Appl. No.: 548,024

[22] Filed: Nov. 2, 1983

Related U.S. Application Data

[63] Continuation of Ser. No. 476,975, Mar. 25, 1983, abandoned, which is a continuation-in-part of Ser. No. 251,682, Apr. 6, 1981, abandoned.

[51] Int. Cl.³ ............................................. A01M 1/20
[52] U.S. Cl. ...................................... 43/131; 43/121; 43/132.1
[58] Field of Search ...................... 43/131, 132.1, 114, 43/121, 107; 250/462.1, 463.1, 464.1, 465.1, 466.1, 467.1

[56] References Cited

U.S. PATENT DOCUMENTS

| | | | |
|---|---|---|---|
| 944,568 | 12/1909 | Mercer | 48/121 |
| 986,015 | 3/1911 | Lambert | 48/121 |
| 2,837,861 | 6/1958 | Graham | 43/131 |
| 2,953,868 | 9/1960 | Chambers | 43/131 |
| 3,257,893 | 6/1966 | Hirsch | 250/464.1 |
| 3,427,743 | 2/1969 | Brunner et al. | 43/131 |
| 3,704,539 | 12/1972 | Alvarez | 43/131 |

FOREIGN PATENT DOCUMENTS 2639494  3/1978  Fed. Rep. of Germany ........ 43/131

Primary Examiner—Nicholas P. Godici
Assistant Examiner—P. Weston Musselman, Jr.
Attorney, Agent, or Firm—Charles J. Fickey

[57] ABSTRACT

An insect feeding station having a base portion with inner walls spaced from outer walls to form a poision compartment, offset openings in said walls, offset opening means in the floor of said base, and, optionally, transparent means in the cover to view said poison compartment. Thus the insect feeding station may be entered from the sides or the bottom and is useful for earth insects. When at least a part of the cover is transparent, the poison compartment may have a contrasting and luminous color under the poison to make removal of poison easily detectable.

9 Claims, 3 Drawing Figures

INSECT FEEDING STATION

This application is a continuation of application Ser. No. 476,975, filed Mar. 25, 1983, which is a continuation-in-part of application Ser. No. 251,682, filed Apr. 6, 1981, both abandoned.

This invention relates to a device for destroying insects. It more particularly relates to an insect feeding station whereby poison may be administered to crawling insects on or in the earth without endangering children or domestic animals.

Various types of devices have been known in the prior art for destroying insects. In some devices, the insects are trapped in the device after entering, either by mechanical construction, or by sticking to a gummy substance. In either instance, the device is soon full and useless. In devices which contained a poison, it was easy to shake out loose poison, or probe through openings to reach the poison, thus making them a danger to children or small domestic animals. In addition, prior devices are generally of a construction that the interior of the device is difficult to view so that it is not readily ascertainable whether insects are using the device or how much poison has been used.

It is, therefore, an object of this invention to provide an insect feeding station which is not dangerous to children.

A further object is to provide an insect feeding station in which it is readily possible to detect the use of the poison.

Another object is to provide an insect feeding station which has both side and bottom entrances.

These and other objects of the invention will become apparent as the description thereof proceeds.

The objects of this invention may be attained and the disadvantages of the prior art devices overcome by the use of the present invention. The invention has a base portion for carrying the poison and a cover. The base portion has outer case walls and an inner compartment containing the poison. The outer case may be of any configuration, e.g., round, square, or rectangular and the inner compartment may have a corresponding configuration. The outer case walls has at least one and preferably three or more openings, and the inner compartment is formed from walls spaced apart from the outer case walls, the inner walls having openings which are offset from the openings in the outer walls so that a probe stuck into an outer wall opening will not enter any opening in the inner wall and contact the poison in the inner compartment. The device further has an outer floor spaced apart from an inner floor with offset openings in each. The cover of the device is permanently affixed to the base and may optionally have at least a part which is transparent so that the poison is visible through the cover.

The poison is preferably of the type known as bait, i.e., it is a mixture of slow acting poison and some food material attractive to insects, such as flour, molasses, peanut butter or the like. The bait is preferably of a paste like or solid consistency. Thus, insects are attracted to the device, eat the bait and leave to die elsewhere. The bait may be a molded shape, e.g., a flat wafer affixed to the floor of the inner compartment.

It is also a part of this invention, when at least a part of the cover is transparent, to coat the floor of the compartment with a contrasting color before putting down the bait, and more desirably the contrasting color may be luminous so that it is readily visible in darkened areas. As bait, is removed by insects, the contrasting color underneath becomes visible and provides an indication whether insects are using the station and how much bait has been used.

The invention may be better understood by reference to the drawings in which

Figure 1:
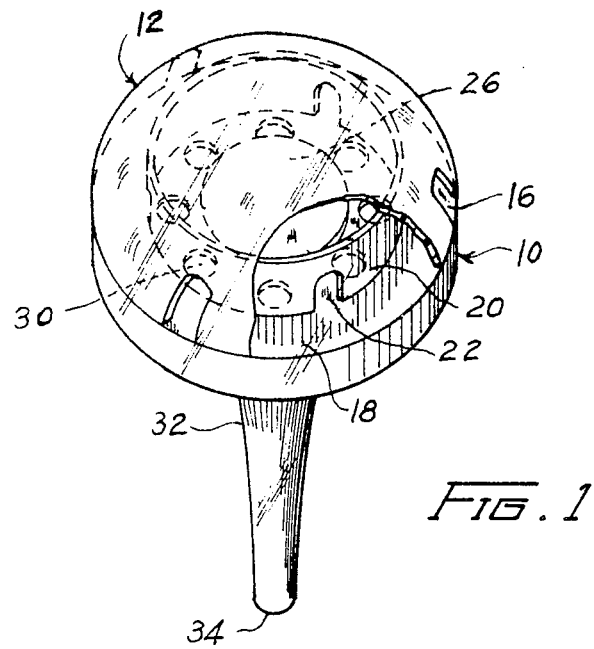
FIG. 1 is a perspective view of the base portion and cover
Figure 3:
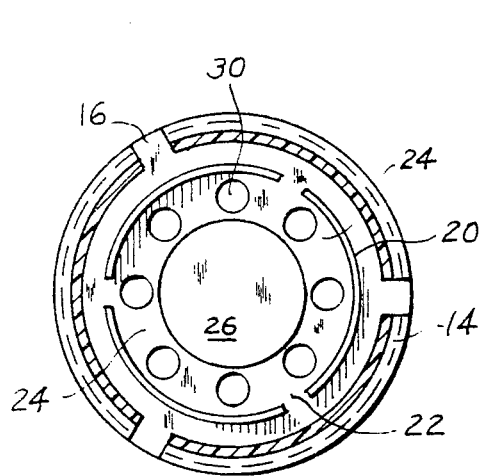
FIG. 3 is a top plan view.

Referring to the Figures, the insect feeding station of the present invention comprises a base portion 10 and cover 12. The station may be made, for example, using the method described in copending, commonly assigned application Ser. No. 476,976 filed Mar. 25, 1983, now abandoned. The base portion may be of any suitable material such as metal or plastic, and may be transparent plastic but need not be transparent. Base portion 10 has an inner floor 18, an outer floor 19 with an opening 21, inner compartment wall 20 with openings 22. Inner compartment wall 20 forms an inner compartment 24. Bait 26 is affixed to floor 18 in inner compartment 24. When at least a part of cover 12 is transparent, as shown, the floor of inner compartment 24 may be coated with a contrasting color layer 28 before affixing the bait. Color layer 28 is preferably a luminescent material. This may be a coating of luminescent paint, or a luminescent dyed paper or the like. If the bait contains an oleagenous ingredient, it is desirable to coat color layer 28 with a protective material, e.g., a resin, before affixing the bait so that the color layer is not soaked with oil or grease and discolored or inactivated. Inner floor 18 also contains openings 30 which are offset from opening 21. A tubular extension 32 may also extend from opening 21, which may be thrust into the earth in use.

Cover 12 extends to the periphery of base portion 10 and forms outer casing walls 14 with openings 16 as described above, to close the base portion 10 and may also be of any suitable material. Cover 12 may have at least a portion which is transparent so that bait 26 may be readily seen. Although the cover has been illustrated as forming the outer case walls 14, it will be readily apparent the case walls could be formed as a part of the base portion 10. Cover 12 is permanently affixed to base 10 as by adhesive or any suitable means.

In one embodiment, the base portion 10 and cover 12 are both of transparent plastic.

As illustrated, the insect feeding station may be used flat on the earth with extension 32 thrust into the earth. Insects may enter the device through openings 16 and offset openings 22 to reach bait 26 in the inner compartment and leave through the same openings. Earth insects may enter through opening 34 of extension 32 then through opening 21 and offset openings 30 to poison compartment 24. In one embodiment, the consumption of bait 26 may be viewed through transparent cover 12, and be readily visible due to contrasting background 28 under the bait.

Figure 2:
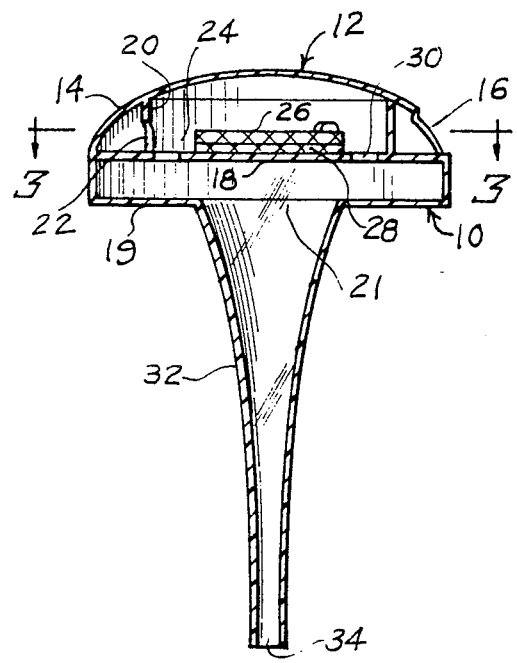
FIG. 2 is a view in elevation.

Although insects may easily reach the bait, it will be readily apparent in FIG. 2 that a probe placed in any opening 16 in the outer casing wall 14 or opening 34 of extension 32 will not enter the inner compartment due to offset of openings 22 in wall 20, and openings 30 in floor 18. Thus the poison bait is safe from inquisitive children.

It will be apparent that outer floor 19 could also be constructed without extension 32 and with a plurality of openings (not shown) which are offset from openings 30 in inner floor 18, and still be within the scope of the present invention.

It will be seen that the present invention provides an insect feeding station for administering poison to insects, particularly earth crawling insects which has an offset entry baffle system so that children cannot probe the bait containing compartment, wherein, optionally, a signal is provided allowing the ready detection of the removal of poisonous bait even in dimly lit areas and without removing the device.

I claim:

1. In an insect feeding station for administering poison to insects comprising a base portion and a cover, said base portion comprising a floor, an outer wall having at least one opening, an inner spaced apart from said outer wall and having at least one opening, said inner wall opening being offset in a horizontal plane from said outer wall opening, said inner wall forming an inner compartment for said poison, the improvement which comprises a second floor below said floor, said outer walls extending to said second floor, at least one opening in said second floor, at least one opening in said floor within said inner wall and offset from said opening in said second floor.

2. The insect feeding station of claim 1 having a plurality of openings in said outer and inner walls, and said inner floor, said openings in said inner walls being offset from said openings in said outer wall.

3. The insect feeding station of claim 1 wherein the opening in said outer floor has a tubular extension.

4. The insect feeding station of claim 1 wherein said poison is a bait mixture of food and poison.

5. The insect feeding station of claim 1 wherein at least a part of said cover is transparent whereby said poison may be visible.

6. The insect feeding station of claim 2 wherein at least a part of said cover is transparent whereby said poison may be visible.

7. The insect feeding station of claim 4 wherein said bait mixture is a solid mixture affixed to the floor of said inner compartment.

8. The insect feeding station of claim 7 further comprising a contrasting color beneath said bait.

9. The insect feeding station of claim 8 wherein said contrasting color is luminescent.

* * * * *